United States Patent [19]

Raiteri

[11] 3,987,552

[45] Oct. 26, 1976

[54] MEASURING APPARATUS

[75] Inventor: Angelo Raiteri, Ivrea, Italy

[73] Assignee: Inductosyn Corporation, Valhalla, N.Y.

[22] Filed: July 1, 1974

[21] Appl. No.: 485,031

[52] U.S. Cl. ............................. 33/178 E; 33/143 L; 33/147 N; 33/172 E
[51] Int. Cl.² ....................... G01B 7/12; G01B 7/02
[58] Field of Search .......... 33/143 R, 143 L, 147 H, 33/147 F, 147 N, 178 R, 178 E, 172 E

[56] References Cited

UNITED STATES PATENTS

| | | | |
|---|---|---|---|
| 1,992,606 | 2/1935 | Darlington | 33/178 R |
| 3,293,759 | 12/1966 | Moe et al. | 33/172 E |
| 3,354,553 | 11/1967 | Heldmaier | 33/147 N |
| 3,781,997 | 1/1974 | Pagella et al. | 33/143 L |
| 3,802,087 | 4/1974 | Raiteri | 33/143 L |

FOREIGN PATENTS OR APPLICATIONS

| | | | |
|---|---|---|---|
| 1,521,786 | 3/1968 | France | 33/178 R |
| 843,930 | 8/1960 | United Kingdom | 33/178 R |

*Primary Examiner*—Richard E. Aegerter
*Assistant Examiner*—Richard R. Stearns
*Attorney, Agent, or Firm*—John L. Downing

[57] ABSTRACT

Two embodiments of an electronic measuring gage are disclosed, each suitable for the visual display of a workpiece dimension. A grinder gage of one embodiment has a single movable measuring probe with both coarse and fine travel components. The measuring probe is mounted on an inner coaxial shaft which is fitted within a sleeve-like outer coaxial shaft. The outer coaxial shaft is slidably mounted in the grinder gage housing for coarse travel and carries the inner shaft and measuring probe with it. The inner shaft is adapted for fine travel relative to the outer shaft, and resilient connection means are provided for connecting the two shafts. One element of an Inductosyn position-measuring transducer is fixed to the inner coaxial shaft and the other element is fixed to the grinder gage housing. A base probe and a positioning probe are also mounted in the housing to maintain the measuring probe and base probe colinear with a diameter of a round workpiece to be measured.

A second embodiment similarly shows a measuring gage having two coaxial shafts arranged within a housing to measure a workpiece dimension between a measuring probe fixed to one end of the inner coaxial shaft and a reference point in fixed spaced relation to the housing. The second embodiment also includes a releasable pushbutton element which ensures that the measuring probe exerts a constant, predetermined force upon the surface of the workpiece during measurement, thereby facilitating uniformity of measurement.

4 Claims, 3 Drawing Figures

MEASURING APPARATUS

BACKGROUND OF THE INVENTION

1. Field of the Invention

The present invention relates to electronic measuring devices and more particularly to gages for the measurement of machine shop workpieces.

2. Description of the Prior Art

Prior art electronic measuring devices for the measurement of internal and external workpiece dimensions are found in many different forms. One such device is described in U.S. Pat. No. 3,802,087 for "Measuring Apparatus" by Raiteri, issued Apr. 9, 1974. That patent discloses a gage for measuring the diameter of a workpiece between two relatively movable probes. One of the measuring probes is adapted for coarse travel and is connected to one of two relatively movable electrically coupled transducer elements. When the coarse-travel probe is positioned against one side of the workpiece, that probe is locked in position and a second, fine travel probe is connected to the other transducer element is moved into contact with the opposite side of the workpiece. The dimension of the workpiece between the probes can then be determined by processing electronic signals generated by the transducer element in a known manner, and no recalibration of the gage is required for the measurement of different dimensions or different workpieces. The transducer element of that gage continuously and accurately measures the separation of the two probes.

It is an object of the present invention to provide a measuring gage which has the advantages of the aforesaid gage, but which makes use of a single movable measurement probe having both coarse and fine travel components, thereby eliminating the need for individually adjusting two relatively movable probes against opposite sides of a workpiece and locking one of those probes in position before determining a measurement.

SUMMARY OF THE INVENTION

The present invention is an electronic apparatus for measuring a workpiece positioned between a reference point and a measuring probe. The apparatus comprises a housing which is fixed in relation to the reference point, and within that housing are mounted two parallel shafts. A first shaft is slidably mounted for coarse travel toward and away from the reference point, and the second shaft is slidably mounted for fine travel relative to the first shaft, toward and away from the reference point. The second shaft has the measuring probe affixed to one end and is advantageously coaxial with and fitted within the first shaft. Resilient means are positioned between the first and second shafts for urging the second shaft away from the first shaft and toward the reference point. The apparatus employs a position-measuring transducer, for example an Inductosyn device, which has two electrically coupled relatively movable elements, one of said elements being fixed to the housing of the apparatus and the other element being fixed to the second shaft.

In a first illustrated preferred embodiment the invention takes the form of a grinder gage for measuring the diameter of a workpiece being worked by a grinder wheel. In this embodiment the reference point is the tip of a base probe which is integral with the housing of the apparatus. The grinder gage additionally includes a slidable positioning shaft and probe which are linked to the movement of the first shaft so that when a cylindrical workpiece is positioned to contact the base, measuring, and positioning probes, the positioning probe maintains the base and measuring probes colinear with a diameter of the workpiece being measured. The grinder gage housing also contains the transducer elements.

In a second preferred embodiment in accordance with the invention a measuring gage for measuring a dimension of a workpiece between a measuring probe and a reference point on a reference surface is shown. The housing of this measuring gage contains first and second shafts and the position-measuring transducer elements as does the housing of the grinder gage embodiment, but the housing is not integral with the reference point. Instead, the housing is fixed in spaced relation to the reference point. The measuring gage of the second embodiment does not include the positioning shaft and probe of the first illustrated embodiment, but it does include a releasable pushbutton element mounted coaxially with the first shaft. Manual force can be applied to the first shaft to bring the measuring probe into contact with the workpiece. Continued application of force to the first shaft causes the inner, second shaft to travel relative to the first shaft in a direction opposed to the urging of the resilient connection means. Upon actuation of the releasable element this relative travel of the first shaft is limited to prevent the first shaft from coming into contact with the workpiece, and thereafter upon the discontinuance of the application of force to the first shaft and the release of the releasable means the resilient connection means is freed to urge the measuring probe against the workpiece with a uniform, predetermined force, thereby facilitating uniformity in the measurement of workpieces.

DETAILED DESCRIPTION

Figure 1:
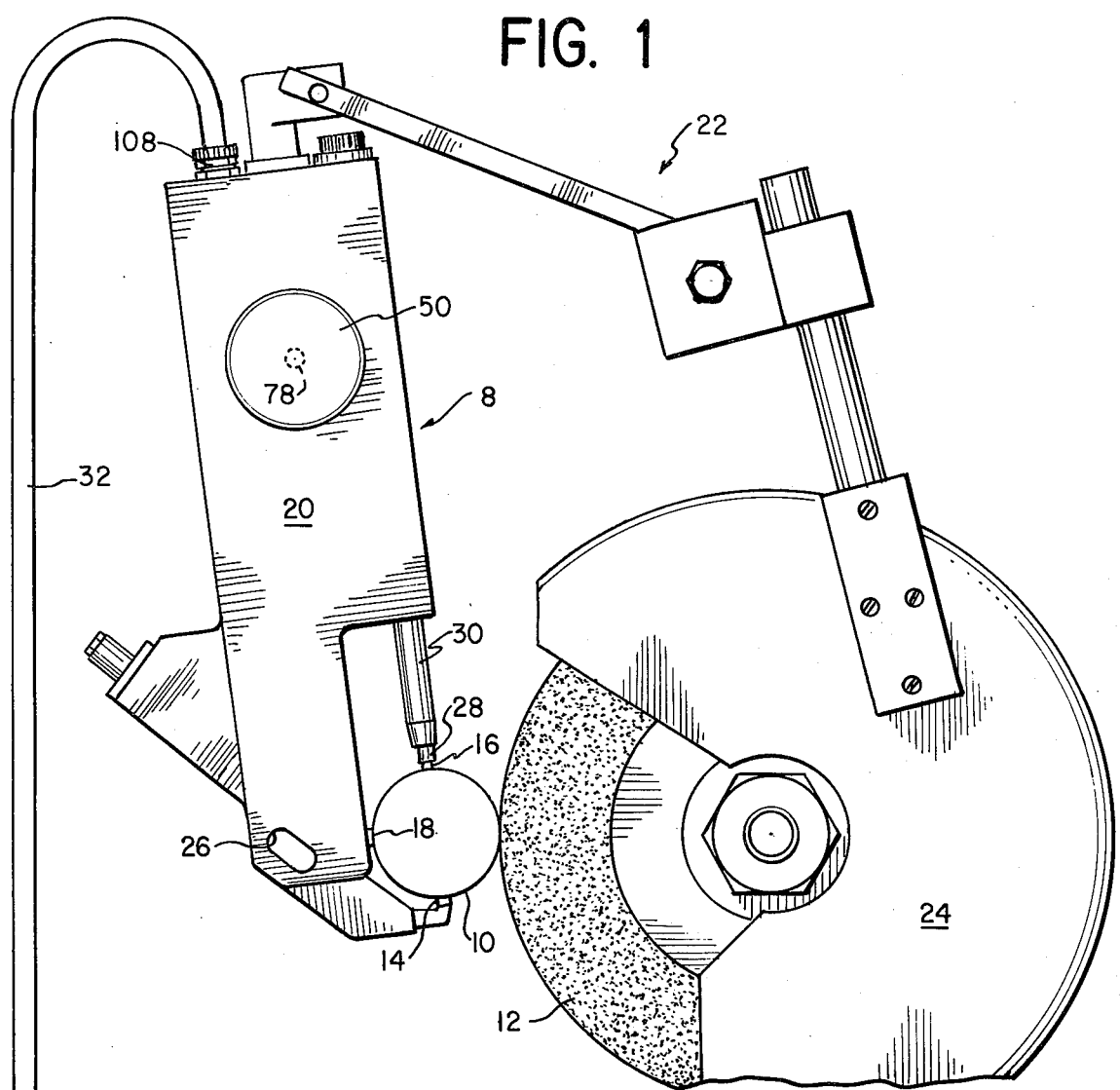
FIG. 1 depicts a schematic representation of a first preferred emobodiment of the measuring apparatus of the present invention wherein a grinder gage is coupled to a digital readout.

In FIG. 1, a first preferred embodiment of the present invention, a grinder gage 8, is shown positioned to measure the diameter of a workpiece 10 which is being ground by a grinder wheel 12. The workpiece 10 is typically undergoing rotation by means not shown.

The workpiece 10 is positioned between the tip of a base probe 14 defining a reference point and the tip of a measuring probe 16. A positioning probe 18 maintains the base probe 14 and measuring probe 16 colinear with a diameter of the workpiece 10. The base probe 14 is fixed to and integral with a housing 20, which in turn is rotatably connected by an adjustable mechanism 22 to a fixed member 24. The adjustable mechanism 22 is designed to support the weight of the grinder gage 8 and to facilitate positioning the probes 14, 16, and 18 on the workpiece 10. A fingerhole 26 is provided in the housing 20 for moving the grinder gage 8 relative to the workpiece 10.

The measuring probe 16 is fixed to one end of a cylindrical inner coaxial shaft 28 which moves within an outer coaxial shaft 30 in a direction toward or away from the base probe 14. The inner coaxial shaft 28 is resiliently connected to the cylindrical sleeve-like outer coaxial shaft 30 which is mounted in the housing 20 for slidable movement in a direction toward or away from the base probe 14. The relative linear displacement of the probes 14 and 16 is measured by a position-measuring transducer such as an Inductosyn transducer enclosed within the housing 20 of the grinder gage 8, as will be described in further detail in connection with FIG. 2. A transducer of the Inductosyn type is described in U.S. Pat. No. 2,799,835 for "Position Measuring Transformer" by R. W. Tripp et al., which is hereby incorporated for reference herein. Such a transducer comprises two relatively movable electrically coupled elments separated by a small air gap. When one of the transducer elements is provided with command signals representative of a relative displacement between the two elements, the other transducer element generates an error signal having an amplitude which is a function of the difference between the displacement represented by the command signals and the actual displacement between the transducer elements.

Electrical connection of the transducer of the grinder gage 8 is made through a cable 32 connected to a digital readout 34 which may be any conventional readout for use with a position-measuring transducer. When the transducer is an Inductosyn transducer, a suitable readout is like that disclosed in U.S. Pat. No. 3,609,320 for "Position Measuring System" by R. W. Tripp. Preferably the readout also includes the improvement of U.S. Pat. No. 3,686,487 for "Trigonometric Signal Generator and Machine Control" by R. W. Tripp. Both referenced U.S. patents are assigned to Inductosyn Corporation.

Briefly, the readout 34 contains a generator 36 which provides sine command signals on lines 38 and cosine command signals on lines 40, and these command signals are transmitted to the polyphase windings of one of the transducer elements. The other transducer element generates an error signal via cable 32 across lines 42 to control circuitry 44 which is connected to the generator 36 and also to an external counter 46. The control circuitry 44 uses the error signal to servo the generator 36 and to provide a digital indication of the relative displacement of the transducer elements, and therefore of the probes 14 and 16. This digital indication appears in the external counter 46 which is connected to a visual display 48.

When it is desired to remove the grinder gage 8 from the workpiece 10 or to position the gage 8 on any new workpiece, a knurled knob 50 on the housing 20 is rotated counter-clockwise to cause the probes 16 and 18 to move away from the base probe 14. Clockwise rotation of the knob 50 causes the measuring probe 16 to move toward the base probe 14 and the positioning probe 18 to be positioned tangent to an imaginary circle whose diameter is the distance between the probes 14 and 16. Further details of the grinder gage 8 are described in FIG. 2.

Figure 2:
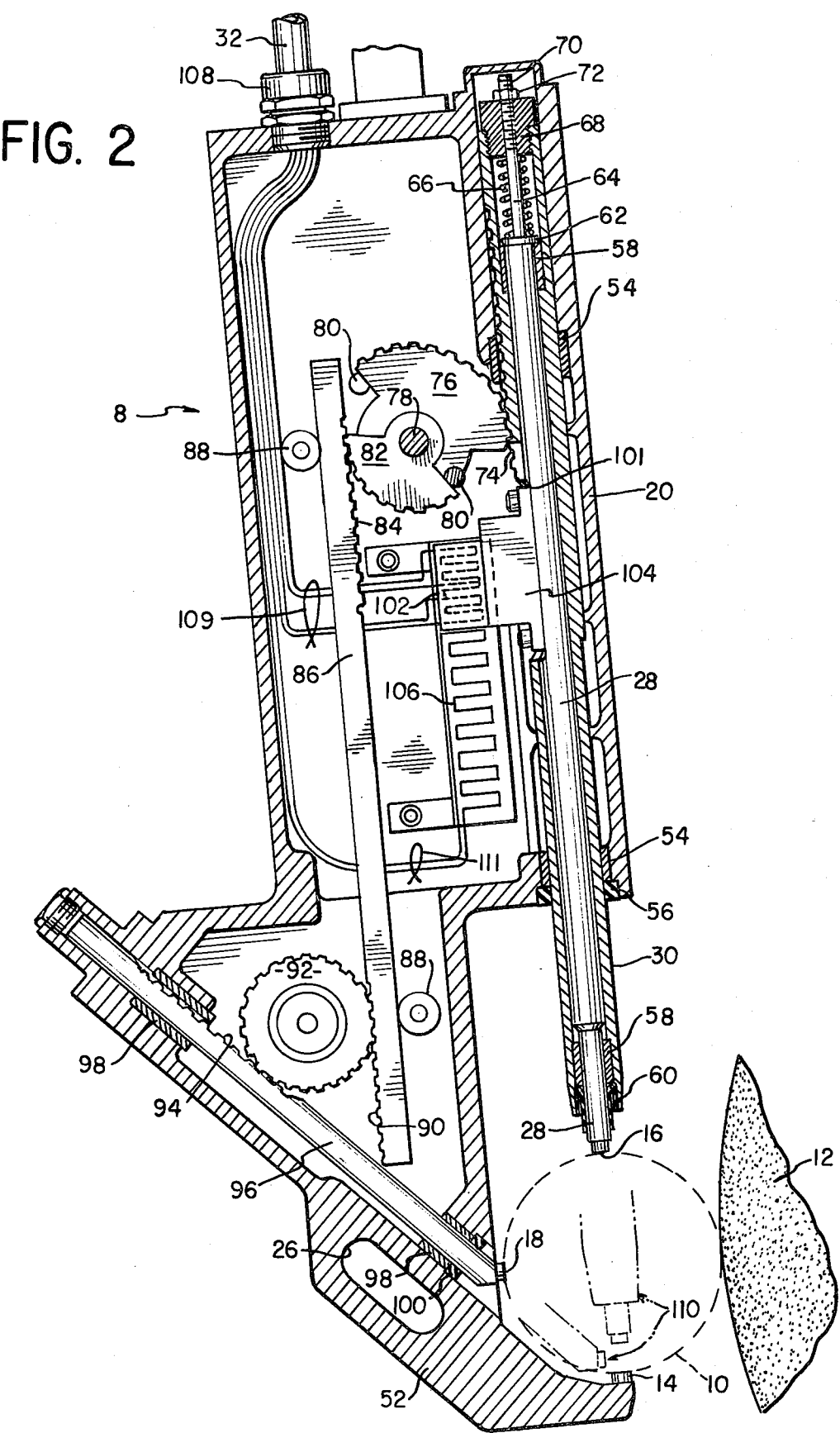
FIG. 2 depicts a longitudinal section of the grinder gage of FIG. 1.

FIG. 2 shows a longitudinal sectional view of the grinder gage 8. The housing 20 is conveniently formed of cast iron having a thermal coefficient of expansion similar to that of the metal of the machine tools to which it is typically attached. A lower extension 52 of the housing contains the previously mentioned finger-hole 26 and has fixed thereto the base probe 14 preferably tipped with diamond. The housing 20 contains the outer coaxial shaft 30 mounted for slidable movement toward and away from the base probe 14. The shaft 30 is of hardened chrome steel and slides in bronze bearings 54 mounted in the housing 20. A high pressure ring-like sealing gasket 56 of a synthetic resin material such as that manufactured under the trademark Teflon is fitted into the housing 20 where the outer coaxial shaft 30 emerges from the housing. The sealing gasket 56 not only serves to keep all foreign matter such as dust and fine metal particles from entering the housing 20 at that point but also applies a considerable compressive force to the outer coaxial shaft 30, thereby resisting any unwanted motion of the shaft.

As will be seen from FIG. 2, the cylindrical outer coaxial shaft 30 is hollow, open at its lower end and closed at its upper end; and has fitted within it the cylindrical inner coaxial shaft 28, also of hardened chrome steel. The inner coaxial shaft 28 is arranged to slide relative to and parallel with the outer coaxial shaft 30 on bronze bearings 58. A diamond-tipped measuring probe 16 is fixed to the end of the inner coaxial shaft 28, and a thin, flexible, oil-resistant gasket 60, preferably of Neoprene rubber, is used to seal the space between the lower end of the outer coaxial shaft 30 and the inner coaxial shaft 28. It should be understood, as described hereinafter, that the outer coaxial shaft 30 is adapted for a coarse travel (e.g., 2.6 inches), and carries the inner coaxial shaft 28 with it in that coarse travel. The inner coaxial shaft 28, however, is mounted for fine travel (e.g., 0.1 inch) relative to the outer coaxial shaft 30.

The upper end of the inner coaxial shaft 28 has a collar 62 and a reduced diameter portion 64 formed therein. The collar 62 abuts against one of the bronze bearings 58 to limit the travel of the inner coaxial shaft 28 relative to the outer coaxial shaft 30 in a downward direction. The portion 64 has a helical steel spring 66 positioned thereon. One end of the spring 66 bears against the collar 62, and the other end of the spring bears against a tension adjusting bolt 68 which is threaded into the upper end of the outer coaxial shaft 30. The adjusting bolt 68 has a threaded bore within it containing a threaded limiting column 70, and a locking nut 72 is threaded on the column 70. By turning the adjusting bolt 68 the tension of the spring 66 can be adjusted over a considerable range (e.g., from about 1 pound to a few ounces). By rotating the threaded limiting column 70 the point at which the upper end of the portion 64 abuts against the lower end of the column 70 when an upward force is applied against the measuring probe 14 the upward travel of the inner coaxial shaft 28 relative to the outer coaxial shaft 30 can be limited. The locking nut 72 fixes the limiting column 70 in a desired position.

The outer coaxial shaft 30 is provided with a first rack 74. A first pinion 76 is fixed on a rotatable shaft 78 mounted on the housing 20 to engage the rack 74. The aforementioned knurled knob 50 is attached to the shaft 78 on the outside of the housing 20, and when the knob 50 is rotated in a clockwise direction the outer coaxial shaft 30 is moved downward from the position shown in FIG. 2. Stops 80 are advantageously provided to limit the rotation of the first pinion 76 and thus the travel of the outer coaxial shaft 30.

A second pinion 82 is mounted concentric with and fixed to the first pinion 76 for simultaneous rotation therewith. The second pinion 82 engages a second rack 84 on a linkage shaft 86 which is mounted in the housing 20 for sliding movement on roller guides 88 in a direction parallel to the travel of the coaxial shafts 28, 30. The linkage shaft 86 has a third rack 90 at a lower end which engages a third pinion 92 rotatably mounted on the housing 20. This third pinion 92 also engages a fourth rack 94 provided on a positioning shaft 96 which is slidably mounted on bronze bearings 98 within the housing 20 for movement at a 45° angle relative to the movement of the coaxial shafts 28, 30 and coplanar with the probes 14, 16, 18. The positioning probe 18, preferably of tungsten carbide, is fixed to the outer end of the positioning shaft 96, and the space between the housing and the positioning shaft 96 where it emerges from the housing 20 is closed by means of a high pressure sealing gasket 100 similar to the gasket 56.

The teeth of all the aforementioned racks and pinions have the same pitch, but the radius of the first pinion 76 is approximately 1.414 times the radius of the second pinion 82. Thus, as the shaft 78 is rotated clockwise, the upward movement of the linkage shaft 86 is approximately 0.707 times (1/1.414) the downward movement of the outer coaxial shaft 30. This diminished movement is transmitted through the third pinion 92 to the angled positioning shaft 96, so that the positioning probe 18 has a component of movement at right angles to the movement of the coaxial shafts 28, 30 such that it is always tangent to an imaginary circle whose diameter is the distance between the base probe 14 and the measuring probe 16. In this manner, when the measuring probe 16 is moved downward to make contact with a cylindrical workpiece 10 positioned on the base probe 14, the simultaneous movement of the positioning probe 18 ensures that the probes 14 and 16 are colinear with a diameter of the workpiece 10.

An aperture 101 is formed in the wall of the outer coaxial shaft 30 within the housing 20 so that a portion of the inner coaxial shaft 28 is exposed. A slider element 102 of a linear Inductosyn transducer is attached by a fixture 104 to that exposed portion of the inner coaxial shaft 28. A scale element 106 of a linear Inductosyn transducer is fixed by bolts to the housing 20 in an opposed spaced relationship to the slider element 102. The cable 32 is connected to the housing by a cable clamp 108 and the sine and cosine command signals 38, 40 are connected from the cable 32 by wires 109 to the slider element 102. Other wires 111 connect the scale element 106 to the error signal lines 42 via cable 32.

In operation, the grinder gage 8 of FIGS. 1 and 2 is positioned by means of the adjustable mechanism 22 so that the base probe 14 contacts the underside of the cylindrical workpiece 10. The knurled knob 50 is then rotated clockwise to move the measuring probe 16 and positioning probe 18 inwardly toward the workpiece 10 until they both contact the workpiece 10. When all three probes are in contact with the workpiece 10 the distance between the measuring probe 16 and the base probe 14 (which is the diameter of the workpiece 10) equals the relative displacement of the transducer elements 102 and 106. The transducer elements are connected to the digital readout 34, which in turn visually displays that diameter in a given measurement system. When the probes are properly positioned about the workpiece 10 the fine travel of the inner coaxial shaft will reflect fine variations of the diameter of a rotating workpiece 10 in the readout 34. A locking mechanism (not shown) can be attached to the knurled knob 50 to lock the outer coaxial shaft 30 in a given position, if desired.

FIG. 2 shows the grinder gage probes opened to their widest extent; the phantom positions 110 of the probes in that Figure shows the probes at a more closed position.

Figure 3:
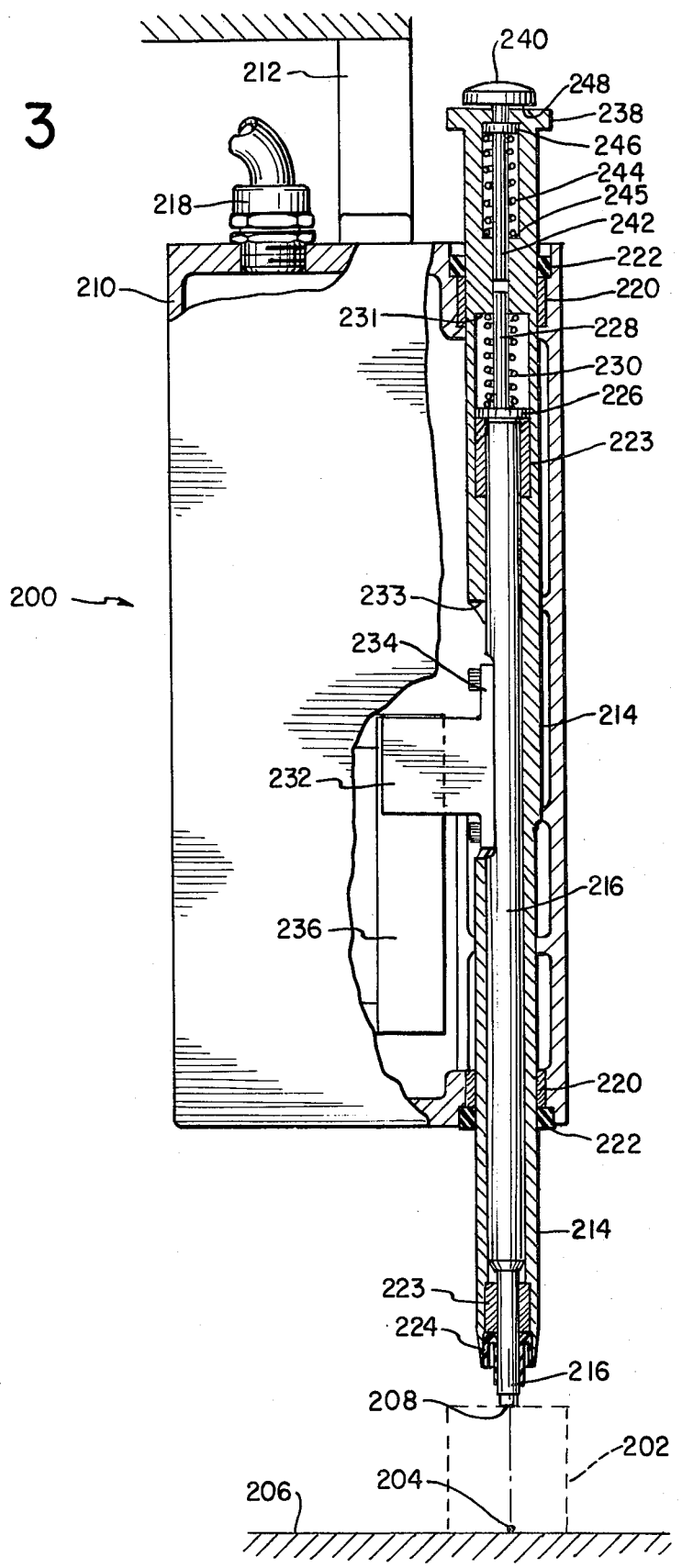
FIG. 3 depicts an elevational view of a second preferred embodiment of the present invention, partially cutaway to reveal the interior of said measuring gage embodiment.

A second preferred embodiment of the present invention is shown in FIG. 3 which depicts a measuring gage 200 for measuring a dimension of a workpiece 202 positioned between a reference point 204 on a surface 206 and a measuring probe 208. The gage 200 has a cast iron housing 210 which is fixed by attaching means 212 in a spaced position relative to the reference point 204. The housing contains an outer coaxial shaft 214 surrounding an inner coaxial shaft 216 to which latter shaft is affixed a diamond-tipped measuring probe 208. The measuring gage 200 also employs an electrical position-measuring transducer such as has been described in connection with the first preferred embodiment, and the elements of this transducer are connected through a cable 218 to a digital readout like that previously described.

Referring to FIG. 3, it will be seen that the arrangement of the inner and outer coaxial shafts 214, 216 within the housing is very similar to the arrangement of the two coaxial shafts in the first described embodiment. Both shafts are cylindrical and of hardened chrome steel. The outer coaxial shaft 214 is mounted for sliding movement on bronze bearings 220 within the housing 210 and its both ends extend beyond the housing. A high pressure sealing gasket 222 of synthetic resin material such as Teflon is fitted in the housing where the upper and lower portions of the outer coaxial shaft 214 emerge from the housing. These gaskets 222 not only hermetically seal the interior of the housing from dust and other harmful material, but they also apply significant resistive compressive force to the outer coaxial shaft 214, so that although it can be manually moved in its bearings 220, it remains in position when external force is removed.

The inner coaxial shaft 216 of hardened chrome steel is fitted within the outer coaxial shaft 214 for fine travel relative to the outer coaxial shaft 214 on bronze bearings 223. The space between the lower ends of the two coaxial shafts 214, 216 is sealed by means of a thin, flexible, oil-resistant Neoprene rubber gasket 224.

The upper end of the inner coaxial shaft 216 is formed with a collar 226 and reduced diameter portion 228. The collar 226 abuts against one of the bronze bearings 223 to limit the downward travel of the inner coaxial shaft 216 relative to the outer coaxial shaft 214, and the portion 228 holds a helical steel spring 230 in position. One end of the spring 230 bears against the collar portion 226, and the other end bears against an internal projection 231 of the outer coaxial shaft 214. As installed, the spring 230 is in compression to urge the inner coaxial shaft 216 downwardly relative to the outer coaxial shaft 214 with a uniform predetermined force.

The outer coaxial shaft 214 has an aperture 233 within the housing 210 which exposes a portion of the inner shaft 216. A slider element 232 of a linear Inductosyn transducer is attached by means of a fixture 234 to that exposed portion of the inner coaxial shaft 216. A scale element 236 of a linear Inductosyn transducer is fixed by bolts to the housing 210 in a spaced relationship to the slider element 232. Both transducer elements 232, 236 are electrically connected by wires (not shown) to the cable 218 in a manner identical to that described in connection with the first embodiment.

The upper end of the outer coaxial shaft 214 has a flange portion 238 which acts to limit the downward travel of that shaft within the housing 210 by striking the top of the housing 210. A pushbutton element 240 is fitted within the upper end of the outer coaxial shaft 214. The pushbutton element 240 has a column portion 242 which holds a helical steel biasing spring 244 in position. The lower end of the biasing spring 244 bears against an internal projection of the outer coaxial shaft 214, and the upper end bears against a pushbutton flange 246 to urge the pushbutton to its most upwardly extended position. In this most extended position (as depicted in FIG. 3) the lower end of the pushbutton column 242 is spaced from the upper end of the pillar 228 attached to the inner coaxial shaft 216 by a first distance (e.g., 2 mm.). In that same position the base surface 248 of the pushbutton is spaced from the upper surface of the flange portion 238 by a second distance (e.g., 1 mm.) which is less than the first distance.

In operation, the housing 210 of the measuring gage of FIG. 3 is fixed in position relative to the reference point 204 and a workpiece 202 is placed over the reference point 204. The measuring probe 208 is then brought into contact with the upper surface of the workpiece 202 by manually pressing down upon the upper end of the outer coaxial shaft 214. This action also depresses the pushbutton element 240. After the measuring probe 208 contacts the workpiece 202 any further downward movement of the outer coaxial shaft 214 by manually applied force causes the column 242 to move toward the portion 228, compressing the helical steel spring 230. When this continued downward movement equals the difference between the aforesaid first and second distance (e.g., 1 mm.) the portion 228 contacts the column 244 and pushes up on the pushbutton 240. Thereafter, when the pushbutton 240 is released and downward force removed from the outer coaxial shaft 214 the gaskets 222 maintain the outer shaft 214 in position, and the biasing spring 244 urges the pushbutton 240 to its uppermost position. The helical spring 230 is then free to exert its uniform predetermined force downwardly so that the measuring probe 208 bears against the workpiece 202 with the same predetermined force. In this manner a constant known force is applied by the measuring probe 208 to any workpiece during measurement, regardless of the initial force with which the measuring probe 208 is applied to the workpiece, thereby contributing to the uniformity of measurement of workpiece dimensions.

It will be understood that although the two described embodiments have been depicted in FIGS. 2 and 3 in a vertical position, and the movement of the coaxial shafts and measuring probes therein have been described in terms of upwards and downwards, both embodiments can be positioned at any angle relative to the vertical required for the measurement of a workpiece dimension. Also, it will be appreciated that although both embodiments illustrated are adapted for the measurement of external workpiece dimensions, suitable extensions of the measuring probes 16, 208 or base probe 14 can be provided by those skilled in the art to permit the measurement of internal workpiece dimensions.

What is claimed is:

1. Apparatus for measuring a workpiece positioned between a reference point and a measuring probe comprising:
   a. a housing fixed in relation to said reference point, said reference point being integral with said housing;
   b. a first shaft slidably mounted in said housing for coarse slidable travel toward and away from said reference point;
   c. a second shaft mounted parallel to said first shaft for fine slidable travel relative to said first shaft toward and away from said reference point, said second shaft having said measuring probe fixed thereto at an end proximal to said reference point;
   d. resilient connection means connecting said first and second shafts for urging said second shaft away from said first shaft toward said reference point; and
   e. a position measuring transducer having two electrically coupled relatively movable elements, one of said elements being fixed to said second shaft; and
   f. a positioning probe on a positioning shaft slidably mounted in said housing, and mechanical linkage means connecting said second and positioning shafts for maintaining said positioning probe substantially in a plane with said measuring probe and reference point and substantially tangent to an imaginary circle in said plane, said circle having a diameter equal to the distance between said measuring probe and reference point; wherein said first and positioning shafts each have a toothed rack thereon, said linkage means further comprising:
   a first pinion rotatably mounted on said housing for engagement with the rack on said first shaft;
   a linkage shaft slidably mounted within said housing and having two toothed racks thereon;
   a second pinion rotatably mounted on said housing concentric with and fixed to said first pinion for engagement with one of the racks on said linkage shaft; and
   a third pinion rotatably mounted on said housing for engagement with the other rack on said linkage shaft and the rack on said positioning shaft.

2. Apparatus according to claim 1 wherein said linkage shaft is parallel to said first and second shafts, the pitch of said first pinion is equal to the pitch of the second pinion, and the ratio of the radius of the first pinion to the radius of the second pinion is substantially 1.414.

3. Apparatus for measuring a workpiece positioned between a reference point and a measuring probe comprising:
   a. a housing fixed in relation to said reference point;
   b. a first shaft slidably mounted in said housing for coarse slidable travel toward and away from said reference point;
   c. a second shaft mounted parallel to said first shaft for fine slidable travel relative to said first shaft toward and away from said reference point, said second shaft having said measuring probe fixed thereto at an end proximal to said reference point;
   d. resilient connection means connecting said first and second shafts for urging said second shaft away from said first shaft toward said reference point; and
   e. a position measuring transducer having two electrically coupled relatively movable elements, one of said elements being fixed to said second shaft;

wherein the application of a force to the first shaft moves the second shaft and moves the measuring probe into contact with said workpiece and the continued application of said force causes the second shaft to travel relative to said first shaft in a direction opposed to the urging of said resilient connection means, said apparatus further comprising:

releasable means for exerting a force upon the first and second shafts and for providing a predetermined limited amount of travel of said second shaft relative to said first shaft during said continued application of force after said measuring probe has contacted said workpiece.

4. Apparatus for measuring a workpiece positioned between a reference point and a measuring probe comprising:

a. a housing fixed in relation to said reference point;
 b. a first shaft slidably mounted in said housing for coarse slidable travel toward and away from said reference point;
 c. a second shaft mounted in said housing parallel to said first shaft for fine slidable travel relative to said first shaft toward and away from said reference point, said second shaft having said measuring probe fixed thereto at an end proximal to said reference point;
 d. resilient connection means connecting said first and second shafts for urging said second shaft away from said first shaft toward said reference point; and
 e. a position measuring transducer having two electrically coupled relatively movable elements, one of said elements being fixed to said second shaft;

wherein the application of a force to the first shaft moves the second shaft and moves the measuring probe into contact with said workpiece, and the continued application of said force causes the second shaft to travel relative to said first shaft in a direction opposed to the urging of said resilient connection means, said apparatus further comprising:

releasable means for exerting a force upon the first and second shafts and for limiting the travel of said second shaft relative to said first shaft during said continued application of force; said releasable means comprising:

1. a pushbutton element mounted coaxially with said first shaft for slidable movement parallel to said first shaft, said element having a first position in which an end of said element proximal to the second shaft is spaced from the end of said second shaft in the absence of the application of force to said first shaft, and a second position in which said end of said element bears upon the end of the second shaft during the continued application of force to the first shaft; and
 2. a biasing spring having one end bearing upon the pushbutton element and the other end bearing upon the first shaft to urge the pushbutton element away from said second position toward said first position.

* * * * *